(12) United States Patent
Nordell et al.

(10) Patent No.: US 9,340,360 B2
(45) Date of Patent: May 17, 2016

(54) SUPERELASTIC LOW ROLLING RESISTANCE CONVEYOR BELT

(71) Applicants: Lawrence K. Nordell, Bellingham, WA (US); Yijun Zhang, Bellingham, WA (US); Robin Bovaird Steven, Dublin, OH (US)

(72) Inventors: Lawrence K. Nordell, Bellingham, WA (US); Yijun Zhang, Bellingham, WA (US); Robin Bovaird Steven, Dublin, OH (US)

(73) Assignee: Veyance Technologies, Inc., Fairlawn, OH (US)

( * ) Notice: Subject to any disclaimer, the term of this patent is extended or adjusted under 35 U.S.C. 154(b) by 274 days.

(21) Appl. No.: 13/628,959

(22) Filed: Sep. 27, 2012

(65) Prior Publication Data

US 2013/0081929 A1   Apr. 4, 2013

Related U.S. Application Data

(60) Provisional application No. 61/541,557, filed on Sep. 30, 2011.

(51) Int. Cl.
*B65G 15/34* (2006.01)
*B65G 15/36* (2006.01)
*B65G 15/30* (2006.01)

(52) U.S. Cl.
CPC .................................. *B65G 15/36* (2013.01)

(58) Field of Classification Search
None
See application file for complete search history.

(56) References Cited

U.S. PATENT DOCUMENTS 6,092,645 A * 7/2000 Wahren ............................ 198/847
7,185,757 B2 * 3/2007 Ishino et al. .................... 198/847

FOREIGN PATENT DOCUMENTS

JP     2010164706 A  *  7/2010

* cited by examiner

*Primary Examiner* — Kavel Singh
(74) *Attorney, Agent, or Firm* — Alvin T. Rockhill; Kathleen K. Bowen

(57) ABSTRACT

The present invention discloses a conveyor belt comprising: a load carrying core, an upper cover layer above said core, a pulley cover layer beneath said core, wherein the pulley cover layer includes at least one high elastic modulus layer which extends beneath at least a portion of the pulley cover layer and wherein the high elastic modulus layer is comprised of a high elastic modulus material and wherein the high elastic modulus material has elastic modulus which is within the range of 0.3 GPa to 220 GPa and wherein the high elastic modulus layer has a thickness which is within the range of 0.005 mm and 4 mm.

19 Claims, 4 Drawing Sheets

SUPERELASTIC LOW ROLLING RESISTANCE CONVEYOR BELT

The benefit of U.S. Provisional Patent Application Ser. No. 61/541,557, filed on Sep. 30, 2011, is claimed hereby. The teachings of U.S. Provisional Patent Application Ser. No. 61/541,557 are incorporated herein by reference in their entirety.

FIELD OF THE INVENTION

The present invention is in the field of conveyor belts. More specifically this invention relates to conveyor belts for the transportation of bulk materials, commonly used within the mining industry, power plants, shipping docks at sea ports, cement plants and other applicable places.

BACKGROUND OF THE INVENTION

Long conveyor systems require vast amounts of energy to run and have a direct impact on the operating costs of mining operations. A large portion of the energy losses from the conveyor belt system is attributable to the viscoelastic hysteresis of the rubber like material which is utilized in manufacturing the conveyor belt. As a section of the conveyor belt passes over a roller that supports the conveyor belt along its path of travel, that section of the conveyor belt locally deforms to match the shape of the roller. Once that section of the conveyor belt is past the roller, the deformation recovers. A significant amount of mechanical energy is consumed by viscoelastic hysteresis and transformed into heat buildup through the repetition of this cycle at each roller.

Conventional conveyor belt designs of the prior art have addressed this problem of energy loss by manufacturing the belt with rubber compounds which exhibit less hysteresis and accordingly results in less heat generation and a lower lovel of low rolling resistance. Such low rolling resistance rubber compounds allowed for less heat loss during the deformation and therefore reduced the amount of energy used as the conveyor belt passed over rollers. However, the utilization of low rolling resistance rubber belts results in only a small reduction in energy consumption as compared to conventional conveyor belts. Since the operation of large conveyor systems consume a tremendous amount of energy there is still an opportunity to save a massive amount of energy by improving the overall efficiency of such conveyor systems by utilizing belts that exhibit reduced levels of hysteresis. Naturally, the savings that can potentially be attained are proportionate to the size of the conveyor systems that utilize wide and long belts offering enormous savings potentials. Even a small improvement in efficiency can offer large cost savings because the energy requirements for operating some of the mammoth belts used in the mining industry is staggering. There accordingly is a long felt need for more efficient conveyor belts that are more energy efficient.

SUMMARY OF THE INVENTION

The present invention discloses a conveyor belt comprising: a load carrying core, an upper cover layer above said core, and a pulley cover layer beneath said core, wherein the pulley cover layer includes at least one high elastic modulus layer which extends beneath at least a portion of the pulley cover layer and wherein the high elastic modulus layer is comprised of a high elastic modulus material and wherein the high elastic modulus material has elastic modulus which is within the range of 0.3 GPa to 220 GPa and wherein the high elastic modulus layer has a thickness which is within the range of 0.005 mm and 4 mm.

In one embodiment of the present invention the high elastic modulus layer extends beneath the center 10% to 85% of the width of the pulley cover layer.

In another embodiment of the present invention the high elastic modulus layer extends only beneath the center 10% to 85% of the width of the pulley cover layer.

In still another embodiment of the present invention the conveyor belt includes a plurality of high elastic modulus layers wherein the cumulative width of the high elastic modulus layers extends beneath no more than 85% of the width of the pulley cover layer.

In yet another embodiment of the present invention the high elastic modulus layers are separated by portions of the pulley cover layer which extend to the bottom surface of the belt.

In still another embodiment of the present invention the cumulative width of the bottom surface of the belt covered by portions of the pulley cover layer is at least 20%.

In yet another embodiment of the present invention the cumulative width of the bottom surface of the belt covered by portions of the pulley cover layer is at least 25%.

In still another embodiment of the present invention the cumulative width of the bottom surface of the belt covered by portions of the pulley cover layer is at least 30%

In yet another embodiment of the present invention the cumulative width of the bottom surface of the belt covered by portions of the pulley cover layer is within the range of 30% to 60%.

In still another embodiment of the present invention the high elastic modulus material has an elastic modulus which is within the range of 0.35 GPa to 200 GPa.

In yet another embodiment of the present invention the high elastic modulus material has an elastic modulus which is within the range of 0.35 GPa to 6 GPa.

In still another embodiment of the present invention the high elastic modulus material has an elastic modulus which is within the range of 0.4 GPa to 3 GPa.

In yet another embodiment of the present invention the high elastic modulus layer has a thickness which is within the range of 0.01 mm and 3.5 mm.

In still another embodiment of the present invention the high elastic modulus layer has a thickness which is within the range of 0.05 mm and 3 mm.

In yet another embodiment of the present invention the high elastic modulus layer has a thickness which is within the range of 0.1 mm and 2 mm.

In still another embodiment of the present invention the high elastic modulus layer is cured affixed to the pulley cover layer without the use of an adhesive.

The present invention further discloses a conveyor belt comprising: a load carrying core, an upper cover layer above said core, a pulley cover layer beneath said core, wherein the pulley cover layer includes high elastic modulus material fibers embedded therein and wherein the high elastic modulus material fibers have elastic modulus which is within the range of 0.3 GPa to 600 GPa.

In another embodiment of the present invention the high elastic modulus material fibers have elastic modulus which is within the range of 100 GPa to 500 GPa.

DETAILED DESCRIPTION OF THE INVENTION

Figure 1:
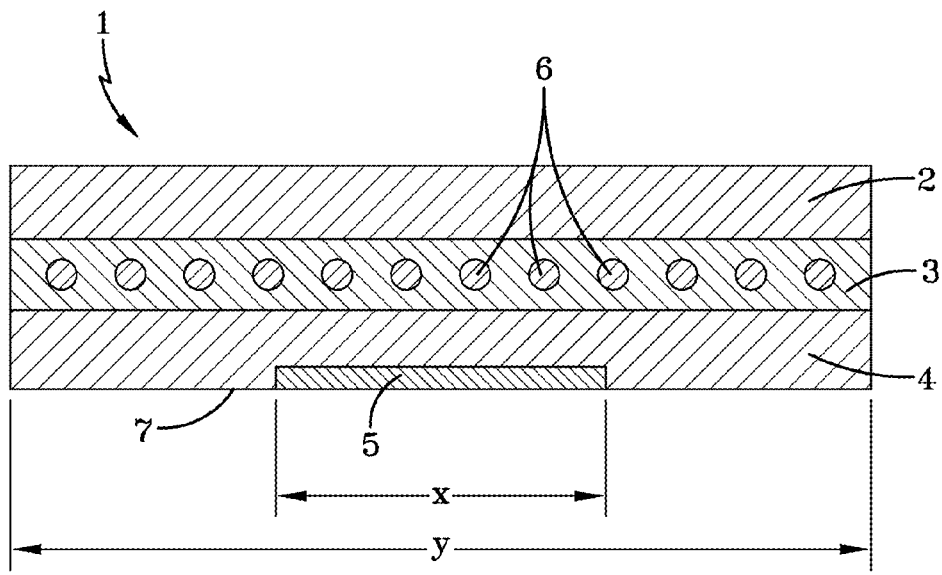
FIG. 1 is a schematic cross-sectional view of an example conveyor belt incorporating the high elastic modulus layer of the present invention.

FIG. 1 shows an example conveyor belt 1 incorporating the high elastic modulus layer 5 of the present invention. The conveyor belt 1 has an upper cover layer 2, a pulley cover layer 4, a high elastic modulus layer 5, and a load carrying core 3. The high elastic modulus layer 5 is positioned on the bottom surface 7 of the pulley cover layer 4. The high elastic modulus layer 5 may be affixed to the bottom surface 7 of the pulley cover 4. More preferably the high elastic modulus layer 5 will be at least partially embedded within the pulley cover 4. Most preferably the high elastic modulus layer 5 will be embedded within the pulley cover 4 so that the bottom surface of the high elastic modulus layer 5 is level with the bottom surface 7 of the pulley cover 4.

The high elastic modulus layer 5 is comprised of a high elastic modulus material. The high elastic modulus material may be any material with elastic modulus within the range of 0.3 GPa to 220 GPa. Preferably the high elastic modulus material will have elastic modulus which is within the range of 0.35 GPa to 200 GPa. More preferably the high elastic modulus material will have elastic modulus which is within the range of 0.35 GPa to 6 GPa. Most preferably the high elastic modulus material will have elastic modulus which is within the range of 0.4 GPa to 3 GPa. The high elastic modulus material will preferably be ultra high molecular weight polyethylene (UHMW-PE). UHMW-PE can be co-cured with the rubber of the pulley cover 4 and therefore does not require the use of adhesives to affix the high elastic modulus layer 5 to the pulley cover 4. Ultra high molecular weight polyethylene which is suitable for utilization in the practice of this invention is commercially available from Ticona as GUR 4113, GUR 4120, GUR 4130, GUR 4152, and GUR 4170. The high elastic modulus material can also be comprised of carbon fibers, aramid fabric, or a carbon/aramid hybrid fabric. The high elastic modulus fibers will typically have elastic modulus which is within the range of 100 GPa to 500 GPa.

The upper cover layer 2 and pulley cover layer 4 may be manufactured using materials and methods well known in the art. The upper cover layer 2 may include a coating layer such as fabric for abrasion resistance and may also include additional strengthening members within the layer. The pulley cover layer 4 likewise may include additional strengthening members within the layer. The load carrying core 3 may be manufactured using materials and methods well known in the art. The load carrying core 3 will generally utilize a plurality of steel cables 6 as the strengthening member. The load carrying core may as an alternative to or in conjunction with the steel cables utilize fabric or polymer components.

Figure 3:
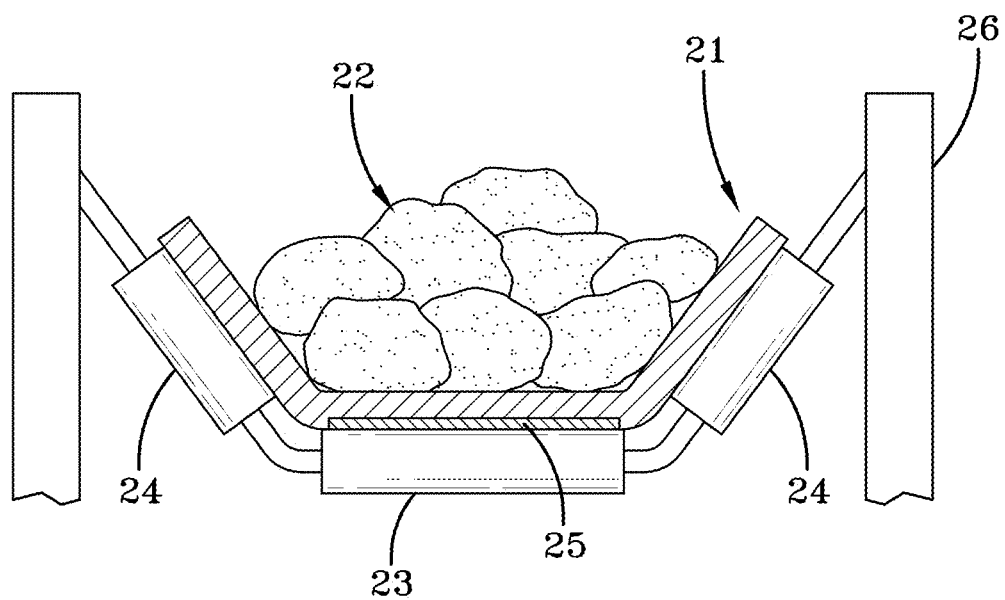
FIG. 3 is a schematic cross sectional view of an example 3-roller trough conveyor belt system.

FIG. 3 shows a typical usage of the conveyor belt 21 of this invention. The invention may be utilized in flat conveyor belt systems or 6 roller pipe conveyor systems, but is most useful in 3-roller troughed conveyor belt systems as shown in FIG. 3. In the 3-roller troughed conveyor belt systems a majority of the weight of the bulk material 22 being moved is located above the center roller 23, and a smaller percentage of the weight is carried along the two angled side rollers 24. The bulk material 22 will often be coal, stone or sand, but could be any other type of bulk material which is to be moved from one location to another.

The use of the high elastic modulus material in the high elastic modulus layer 5 is able to reduce the power consumption of the conveyor belt during usage because it reduces the level of compression in the pulley cover 4 as it travels over the rollers 23 of the conveyor belt system 26. The reduced compression leads to reduced energy loss from the hysteresis of the material from which the pulley cover 4 is made.

Figure 4:
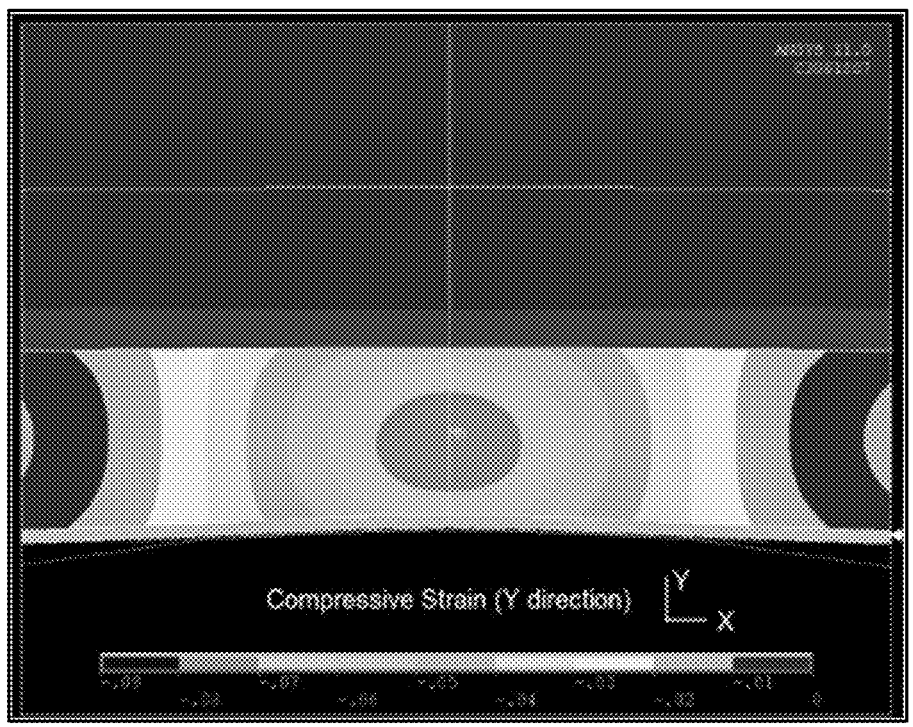
FIG. 4 is a schematic diagram of the contact pressure in a belt as it passes over the rollers of a 3-roller trough conveyor belt system.

FIG. 4 shows the areas of different levels of compressive strain in the pulley cover of an example conveyor belt. The highest compressive strain is directly above the contact area between the conveyor belt and the roller. The level of compressive strain reduces both before and after the roller along the length of the belt. The high modulus material also reduces the amount of deformation the pulley cover exhibits as it moves over the roller. The reduction in deformation of the pulley cover results in a decreased contact length between the pulley cover and the pulley.

Figure 5:
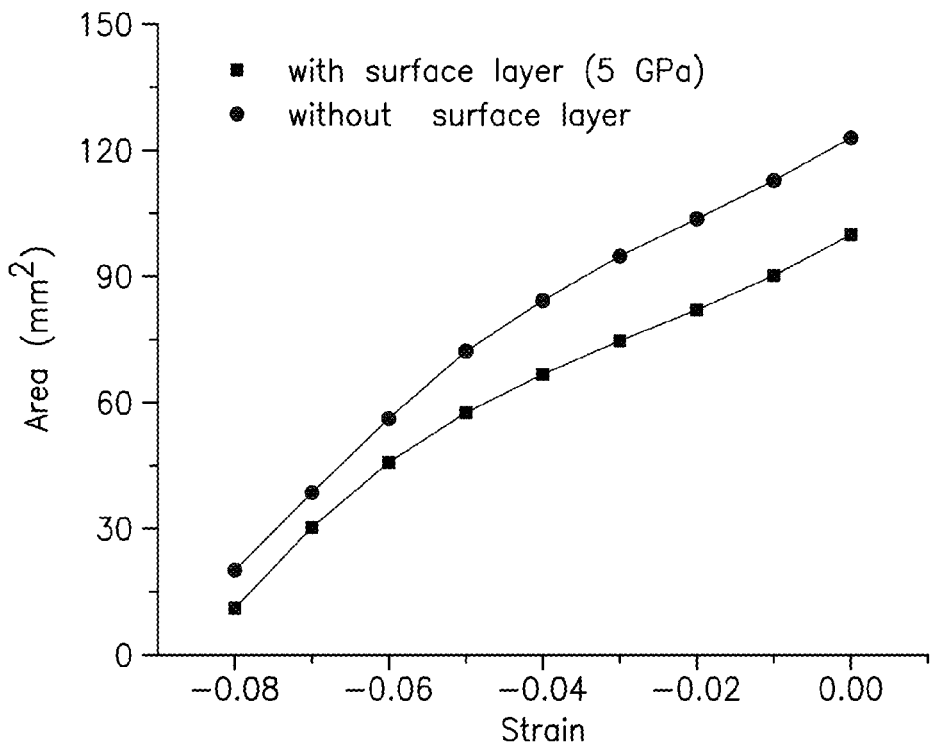
FIG. 5 is a schematic diagram comparing the compressive strain in conveyor belts with and without the high modulus layer.

FIG. 5 shows a comparison of the amount of area of different levels of compressive strain for a conveyor belt with a high modulus layer and a conveyor belt without a high modulus layer. The overall compressive strain and the area of strain for each compressive strain level are reduced through use of the high modulus layer. Because there is less strain and therefore less compression in the pulley cover when using the high modulus layer, the conveyor belt with the high modulus layer will be more efficient than the conveyor belt without the high modulus layer.

Figure 6:
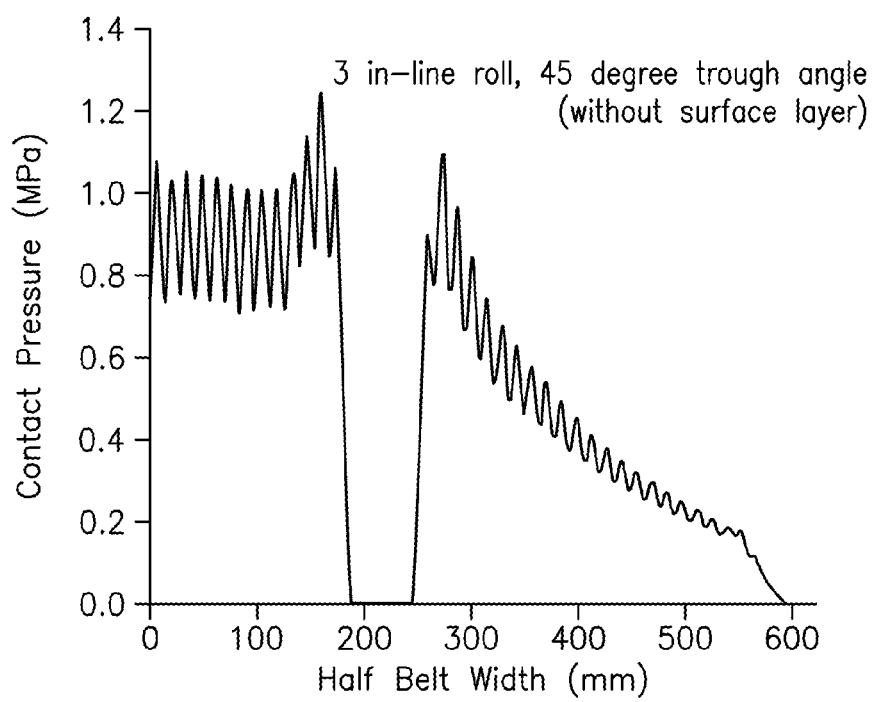
FIG. 6 is a graph which plots contact pressure as a function of half belt width.

FIG. 6 shows a diagram of an example of the contact pressure along the width of one half of a loaded conveyor belt in a 3-roller troughed conveyor belt system. The contact pressure is the highest along the width of the center roller with a peak at the edge of the center roller (from 0 to about 200 mm), there is a section with no contact pressure which correlates to the gap between the center roller 23 and the angled side roller 24 (from about 200 mm to about 250 mm), from there the contact pressure decreases as the weight of the bulk material 22 decreases until there is either no more load carried by a portion of the belt or the edge of the belt (from about 250 mm to about 600 mm). The values in this example diagram are only for reference and are not limiting to the invention.

Conveyor belts must bend around the pulleys at the end of the conveyor belt system in order to form a complete loop. The belt must be able to bend to a relatively small radius in order to keep the end pulley size reasonable. The conveyor belt must be able to wrap around the end pulley tightly in order to maintain a sufficient tension on the conveyor belt. The conveyor belt must also be able to straighten out again, directly after leaving the end pulley in order to travel along the conveyor belt path. If the high modulus layer were too thick, it would cause the conveyor belt to be unable to bend to the proper diameter in order to wrap around the end pulley. Another possible detriment to a thick high modulus later is that it could cause a greater amount of energy be used in order to accomplish the bending and unbending of the conveyor belt during operation. In order to gain the benefits of the high modulus layer, while minimizing the detrimental power consumption at the end pulleys, the high modulus layer should have a thickness which is within the range of 0.005 mm and 4 mm. Preferably the high modulus layer will have a thickness which is within the range of 0.01 mm and 3.5 mm. More preferably the high modulus layer will have a thickness which is within the range of 0.05 mm and 3 mm. Most preferably the high modulus layer will have a thickness which is within the range of 0.1 mm and 2 mm.

Conveyor belts that are used in 3-roller trough conveyor belt systems 26 like the one shown in FIG. 3 experience additional bending because they are in a flat shape upon the return portion of the conveyor belt route and when traveling around the end pulleys, but they assume a trough shape as shown by the conveyor belt 21 in FIG. 3 when they travel through the load carrying portion of the conveyor belt route. The additional bending at the bend areas 27 would require more energy if the high modulus layer 25 were to be in that area. For this reason, it is preferable that the high modulus layer 25 only extend beneath the center 10% to 85% of the width of the pulley cover layer 4 for conveyor belts which are to be used in 3-roller trough conveyor belt systems.

Having a high modulus layer which does not extend beneath the entire width of the pulley cover layer 4 is also beneficial because the area of the pulley cover layer under which the high modulus layer does not extend is available for contact with the end pulleys. Normally one end pulley is the drive pulley of the conveyor belt system and often relies on the friction between the end pulley and the conveyor belt to impart a driving force.

The high modulus layer is generally made from a more expensive material than that used for the pulley cover layer. For this reason, it may also be desirable to have a high modulus layer which does not extend beneath the entire pulley cover layer.

Figure 7:
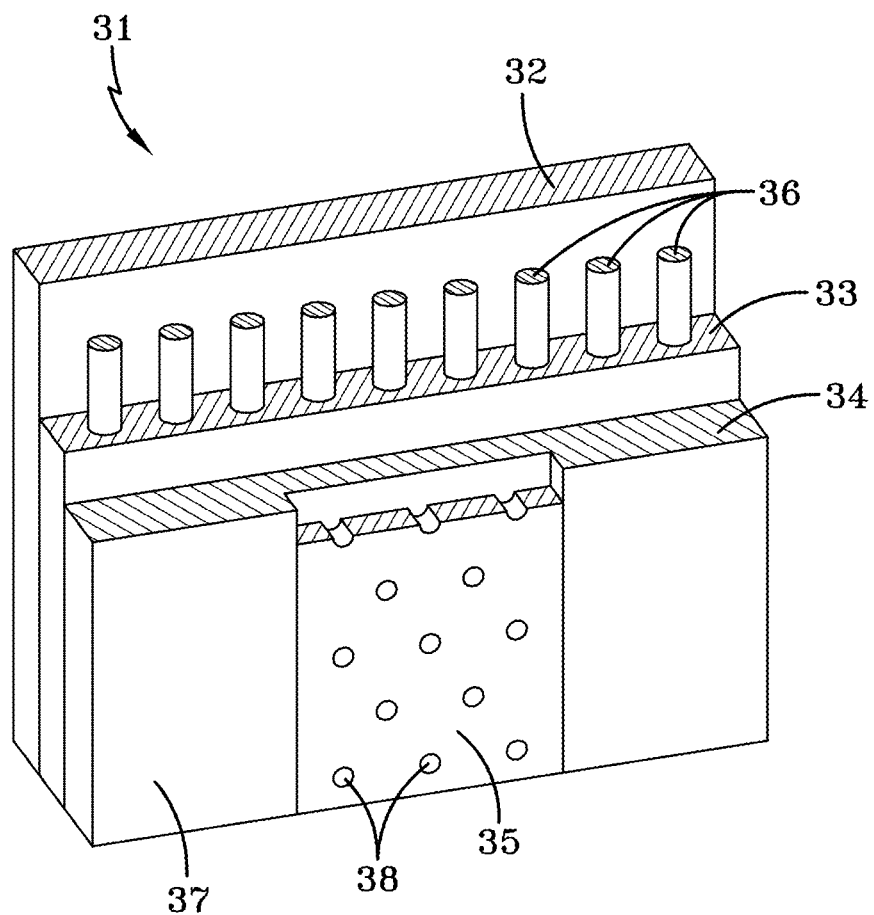
FIG. 7 illustrates one embodiment of this invention wherein the conveyor belt includes a perforated high modulus layer.

FIG. 7 illustrates one embodiment of this invention wherein the conveyor belt 31 incorporates the high modulus layer 35 in the same manner as shown in FIG. 1. The conveyor belt 31 has an upper cover layer 32, a pulley cover layer 34, a high modulus layer 35, and a load carrying core 33. The high modulus layer 35 is positioned on the bottom surface 37 of the pulley cover layer 34. The high modulus layer 35 may be affixed to the bottom surface 37 of the pulley cover 34. More preferably the high modulus layer 35 will be at least partially embedded within the pulley cover 34. Most preferably the high modulus layer 35 will be embedded within the pulley cover 34 so that the bottom surface of the high modulus layer 35 is level with the bottom surface 37 of the pulley cover 34.

The high modulus layer 35 may be perforated so that a plurality of perforations 38 create passages for steam and/or hot gasses to escape through the high modulus layer 35 from the portion of the pulley cover 34 which is in contact with the high modulus material 35 along the width of the conveyor belt 31. These perforations 38 may be of any shape. Preferably the perforations 38 will be circular or rectangular in shape. Perforations of rectangular shape may be very narrow, so that they may be accurately referred to as slits.

Figure 2:
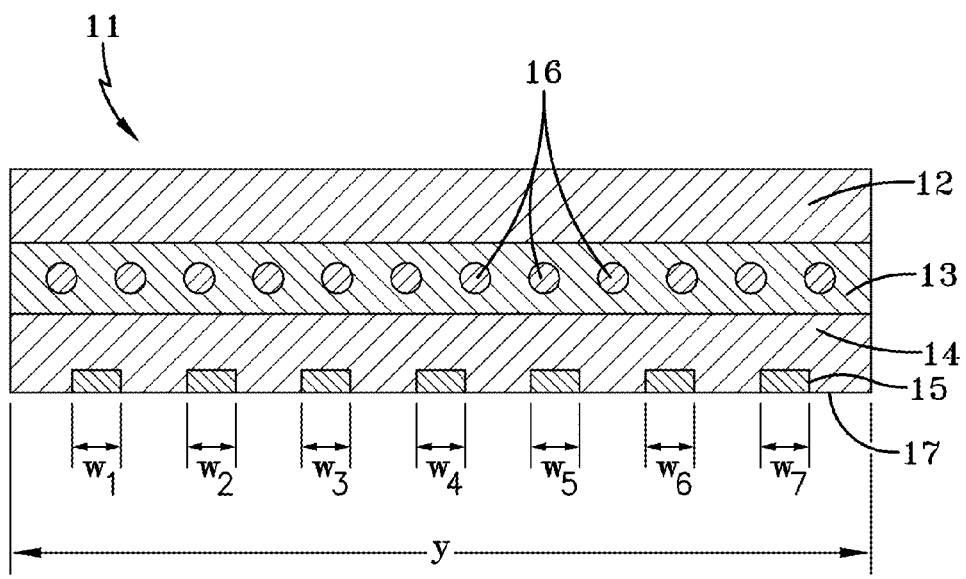
FIG. 2 is a schematic cross-sectional view of a conveyor belt of this invention which incorporates a plurality of high elastic modulus layers 15 therein.

Alternatively to reducing the width of the high modulus layer, multiple high modulus layers may be utilized. FIG. 2 shows an example conveyor belt 11 incorporating a plurality of high modulus layers 15 of the present invention. The conveyor belt 11 has an upper cover layer 12, a pulley cover layer 14, a plurality of high modulus layers 15, and a load carrying core 13. The plurality of high modulus layers 15 is positioned on the bottom surface 17 of the pulley cover layer 14. The plurality of high modulus layers 15 may be affixed to the bottom surface 17 of the pulley cover 14. More preferably the plurality of high modulus layers 15 will be at least partially embedded within the pulley cover 14. Most preferably the plurality of high modulus layers 15 will be embedded within the pulley cover 14 so that the bottom surfaces of the plurality of high modulus layers 15 are level with the bottom surface 17 of the pulley cover 14. The plurality of high modulus layers 15 may have any spacing or positioning across the width of the bottom surface of the pulley cover 14. Generally the cumulative width of the high modulus layers 15 ($W_1+W_2+W_3+W_4+W_5+W_6+W_7$) will cover at least 20% of the total width y of the belt 11 and will not extend beneath more than 85% of the width y of the pulley cover layer 14. Typically the cumulative width of the bottom surface of the belt covered by portions of the pulley cover layer 17 will represent at least 20% of the width of the belt and will more typically represent at least 25% of the width of the belt 11. Preferably the cumulative width of the high modulus layers will not extend beneath more than 70% of the width of the pulley cover layer. More preferably the cumulative width of the high modulus layers will not extend beneath more than 60% of the width of the pulley cover layer. Most preferably the cumulative width of the high modulus layers will not extend beneath more than 50% of the width of the pulley cover layer. In some cases the cumulative width of the bottom surface of the belt 17 covered by portions of the pulley cover layer 14 represents between 30% to 60% of the total width of the belt 11.

For conveyor belts to be used in 3-roller trough systems, the plurality of high modulus layers 15 should not be placed within the bend areas 27 of the belt. Any part of a high modulus layer placed within the bend area 27 will not provide an efficiency improvement because there is no contact between the bend area of the conveyor belt 27 and the rollers of the system and therefore there is deformation of the rubber in the pulley cover layer in the bend area 27. Also, the positioning of any part of a high modulus layer in the bend area will increase the power consumption of the conveyor belt when transitioning between the flat and troughed shape of the conveyor belt at different locations along the route followed by the conveyor belt in a 3-roller troughed system.

The power consumption due to the indentation of the pulley cover as it travels over the roller is proportional to the square of strain ($\epsilon_0$) provided that the real modulus of elasticity (E') and phase angle ($\delta$) are constant. The power consumption can be calculated using the following formula: power consumption $(W_h)=\pi \cdot E' \cdot \epsilon_0 \cdot \tan(\delta)$. Finite element analysis is able to provide a more accurate mapping of $\epsilon_0$ than conventional calculations. The map of $\epsilon_0$ can then be used to obtain a more accurate calculation of the power consumption.

Example 1

A conveyor belt with a construction as shown in FIG. 1 can be manufactured with a 1 mm thick high modulus layer. The high modulus layer having a modulus of elasticity of 5 GPa. When compared to a conventional conveyor belt of similar construction, the conveyor belt with the high modulus layer will have a contact length between the roller and the conveyor belt which is reduced by about 20%. The power consumption of the belt with the high modulus layer will be reduced by about 12.6%.

Example 2

A conveyor belt with a construction as shown in FIG. 1 can be manufactured with a 1 mm thick high modulus layer. The high modulus layer having a modulus of elasticity of 200 GPa. When compared to a conventional conveyor belt of similar construction, the conveyor belt with the high modulus layer will have a contact length between the roller and the conveyor belt which is reduced by about 75%. The power consumption of the belt with the high modulus layer will be reduced by about 26.6%.

While certain representative embodiments and details have been shown for the purpose of illustrating the subject invention, it will be apparent to those skilled in this art that various changes and modifications can be made therein without departing from the scope of the subject invention.

What is claimed is:

1. A conveyor belt comprising: a load carrying core, an upper cover layer above said core, a pulley cover layer beneath said core, wherein the pulley cover layer includes at least one high elastic modulus layer which extends beneath at least a portion of the pulley cover layer and wherein the high elastic modulus layer is comprised of a high elastic modulus material and wherein the high elastic modulus material has elastic modulus which is within the range of 0.3 GPa to 220 GPa and wherein the high elastic modulus layer has a thickness which is within the range of 0.005 mm and 4 mm.

2. The conveyor belt of claim 1, wherein the high elastic modulus layer extends beneath the center 10% to 85% of the width of the pulley cover layer.

3. The conveyor belt of claim 1, wherein the high elastic modulus layer extends only beneath the center 10% to 85% of the width of the pulley cover layer.

4. The conveyor belt of claim 1, wherein the conveyor belt includes a plurality of high elastic modulus layers wherein the cumulative width of the high elastic modulus layers extends beneath no more than 85% of the width of the pulley cover layer.

5. The conveyor belt of claim 4, wherein the high elastic modulus layers are separated by portions of the pulley cover layer which extend to the bottom surface of the belt.

6. The conveyor belt of claim 5, wherein the cumulative width of the bottom surface of the belt covered by portions of the pulley cover layer is at least 20% of the width of the belt.

7. The conveyor belt of claim 5, wherein the cumulative width of the bottom surface of the belt covered by portions of the pulley cover layer is at least 25% of the width of the belt.

8. The conveyor belt of claim 5, wherein the cumulative width of the bottom surface of the belt covered by portions of the pulley cover layer is at least 30% of the width of the belt.

9. The conveyor, belt of claim 5, wherein the cumulative width of the bottom surface of the belt covered by portions of the pulley cover layer is within the range of 30% to 60% of the width of the belt.

10. The conveyor belt of claim 1, wherein the high elastic modulus material has an elastic modulus which is within the range of 0.35 GPa to 200 GPa.

11. The conveyor belt of claim 1, wherein the high elastic modulus material has an elastic modulus which is within the range of 0.35 GPa to 6 GPa.

12. The conveyor belt of claim 1, wherein the high elastic modulus material has an elastic modulus which is within the range of 0.4 GPa to 3 GPa.

13. The conveyor belt of claim 1, wherein the high elastic modulus layer has a thickness which is within the range of 0.01 mm and 3.5 mm.

14. The conveyor belt of claim 1, wherein the high elastic modulus layer has a thickness which is within the range of 0.05 mm and 3 mm.

15. The conveyor belt of claim 1, wherein the high elastic modulus layer has a thickness which is within the range of 0.1 mm and 2 mm.

16. The conveyor belt of claim 1, wherein the high elastic modulus layer is cured affixed to the pulley cover layer without the use of an adhesive.

17. A conveyor belt comprising: a load carrying core, an upper cover layer above said core, a pulley cover layer beneath said core, wherein the pulley cover layer includes high elastic modulus material fibers embedded therein and wherein the high elastic modulus material fibers have elastic modulus which is within the range of 0.3 GPa to 600 GPa.

18. The conveyor belt of claim 17, wherein the high elastic modulus material fibers have an elastic modulus which is within the range of 100 GPa to 500 GPa.

19. The conveyor belt of claim 1, wherein the high elastic modulus material is ultra high molecular weight polyethylene.

* * * * *